Patented Nov. 18, 1947

2,430,950

UNITED STATES PATENT OFFICE 2,430,950

RESIN MODIFIED N-ALKOXYMETHYL POLYAMIDE AND PROCESS FOR OBTAINING SAME

Henry S. Rothrock, Wilmington, Del., assignor to E. I. du Pont de Nemours & Company, Wilmington, Del., a corporation of Delaware No Drawing. Application August 11, 1944, Serial No. 549,123

5 Claims. (Cl. 260—6)

This invention relates to new polymeric compositions and more particularly to polyamides.

This invention has as an object the preparation of new and useful compositions of matter. A further object is the production of compositions derived from polyamides useful in the preparation of adhesives, finishes, molded objects, etc. Other objects will appear hereinafter.

The above objects are accomplished by the following invention which comprises reacting a synthetic linear polyamide with an alcohol and formaldehyde in excess, followed by reaction of the solution containing the excess formaldehyde with a material which is capable of reaction with formaldehyde to form a resin.

The synthetic linear polyamides employed in the process of this invention are those of the general class described in U. S. Patents 2,071,250, 2,071,253, and 2,130,948. These polyamides are high molecular weight polymers having an intrinsic viscosity of at least 0.4 as defined in United States Patent 2,130,948, and in general comprise the reaction products of linear polymer-forming compositions containing amide-forming groups, e. g., difunctional molecules each of which contains two reactive amide-forming groups which are complementary to reactive amide-forming groups in other molecules. The polyamides can be prepared by such methods as self polymerization of a monoaminomonocarboxylic acid, by reacting a diamine with a dibasic carboxylic acid or by reacting a monoaminomonohydric alcohol with a dibasic carboxylic acid in substantially equimolecular amounts. Reference to amino acids, diamines, dibasic carboxylic acids and aminoalcohols is intended to include the equivalent amide-forming derivatives of these reactants. The average number of carbon atoms separating the amide groups in these reactions is at least two. The linear polyamides also include polyester-amides such as those obtained by admixture of the polymer-forming composition with other linear polymer-forming reactants such as glycol-dibasic acid mixtures. It is necessary that the synthetic linear polyamide employed has a substantial amount of hydrogen-bearing carbonamide groups.

When the synthetic linear polyamides of the type previously described are treated with an aliphatic or substituted aliphatic alcohol such as ethyl alcohol, methyl alcohol, isobutyl alcohol, benzyl alcohol, etc., and formaldehyde or a formaldehyde-liberating material, in the presence of small amounts of an acid catalyst such as phosphoric acid, hydroxy-acetic acid, para-toluene sulfonic acid, etc., there are formed new polymeric amides which differ in solubility, as well as other physical and chemical properties from the synthetic linear polyamide from which they are derived. The acid catalysts useful for this reaction are oxygen-containing acids having an ionization constant at least as great as $9.6 \times 10^{-6}$ and an equivalent conductance, measured at 25° C. in 0.01 N concentration, no greater than 270 ohms$^{-1}$ cm.$^2$. In this reaction substantial amounts of the hydrogen-bearing carbonamide groups of the synthetic linear polyamide are converted to the N-alkoxymethyl derivatives, that is, to polymers having the recurring group

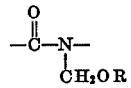

in which R is an aliphatic group derived from the alcohol employed. The production of the N-alkoxymethyl polyamides is described more particularly in application Serial No. 539,195, filed June 7, 1944, by T. L. Cairns.

In the practice of the present invention the polyamide and alcohol is reacted in the presence of the oxygen-containing acid catalyst with formaldehyde in considerable excess and the N-alkoxymethyl polyamide solution obtained reacted with the formaldehyde-reactive resin forming material. The formaldehyde is used in about sixteen times the theoretical amount required to yield a desired degree of substitution of hydrogen by alkoxy-methyl on carbonamide groups. The proportions in general are one part of synthetic linear polyamide, 0.75 to 12.5 parts of alcohol, and 0.5 to 5.0 parts of formaldehyde. In one method, a solution of the polyamide in formic acid is reacted with the alcohol and formaldehyde at moderate temperature which is preferably 25° C. to 75° C. but which can be as low as 0° C. and as high as the decomposition temperature of the polyamide for the particular reaction time. In another method, the reaction is conducted in the presence of but a small amount of the oxygen containing acid catalyst at a temperature of from 20° C. to 200° C. In either method, the reaction product is reacted with a formaldehyde-reactive material which is known to readily react with formaldehyde to form resins.

The resin-forming formaldehyde-reactive materials comprise urea and such closely related derivatives as thiourea and melamine. Phenols are also particularly useful for the present purpose, the preferable materials of this class being phenol itself and phenols having at least three nuclear hydrogens, such as resorcinol and cresol. Other useful formaldehyde-reactive materials are sulfonamides such as paraffin wax polysulfonamide and proteins such as casein, zein, and soybean protein. The formaldehyde-reactive materials used are preferably those which react with formaldeyhe to form heat-hardening resins.

The invention is further illustrated by the following examples in which the parts are by weight unless otherwise specified.

Example I

The N-alkoxymethyl polyamide prepared from synthetic linear polyamide, alcohol, and excess formaldehyde is obtained by placing the following charge in a nickel autoclave equipped with a stirrer: 10 parts of polyhexamethylene adipamide which had been pulverized to pass a 20-mesh screen, 125 parts of methanol, 96 parts of formaldehyde, 28.8 parts of water and 0.125 part of sodium hydroxide. The mixture was heated at approximately 135° C. with agitation and 3.6 parts of the oxygen-containing acid catalyst consisting of 85% phosphoric acid was then injected. After about 8 minutes, during which time the temperature was maintained at approximately 135° C., the contents of the autoclave were discharged into a solution consisting of approximately 250 parts of methanol, 80 parts of water and 8 parts of 28% aqueous ammonia. The resulting solution consisted essentially of about 22% of N-methoxymethyl polyhexamethylene adipamide and 13% formaldehyde in aqueous methanol.

The solution thus obtained is reacted with the formaldehyde reactive material by adding to 91 parts of the solution 13 parts of urea and 8 parts of 1 normal aqueous sodium hydroxide solution to neutralize the acid catalyst and to give a pH of 8-9. After heating in a steam bath for a few minutes, the solution contained only 2.1% formaldehyde.

The solution thus obtained was coated on $\frac{1}{16}$" birch veneer and allowed to dry overnight. The coated surfaces of three plies were placed together with the grain of the center ply at right angles to the grain of the other plies and pressed in a hydraulic press heated at 120° C. for 20 minutes at 70 lbs./sq. in.

In another application of the resin-modified alkoxymethyl polyamide obtained in accordance with the foregoing example, 0.17 part of a curing catalyst consisting of maleic acid was added to 20 parts of the urea-formaldehyde-modified polyamide solutions. This solution was coated on birch veneer in the manner described above. The dry shear strength of the plywood with the maleic acid catalyst was 460 lbs./sq. in. as compared with 414 lbs./sq. in. when no catalyst was employed. With acid catalyst approximately 100% wood failure was noted while there was only 46% when no catalyst was employed. After 3 hours in boiling water, the plywood which was prepared by the use of the maleic acid-urea-formaldehyde-modified polyamide solution had a shear strength of 100 lbs./sq. in.

In the following examples, the N-alkoxymethyl polyamide solution is that described in the preceding example.

Example II

To about 45.5 parts of the N-alkoxymethyl polyamide solution there was added 7.4 parts of resorcinol. The solution was heated on a steam bath for about 25 minutes with stirring. The solution was cooled and 1% (based on weight of solids) maleic acid added, after which the solution was coated on birch veneer and the volatile solvents allowed to evaporate. Plywood which was prepared by pressing the laminae under a pressure of 70 lbs./sq. in. at 120° C. for 20 minutes possessed a dry shear strength of 525 lbs./sq. in. with 94% wood failure. After immersion in boiling water for 3 hours the shear strength of the plies was 440 lbs./sq. in. with 30% wood failure. Since Army-Navy specifications AN–NN–P–511b for aircraft plywood requires a minimum dry shear strength of 380 lbs./sq. in. and 290 lbs./sq. in. in the boil test, it is seen that this adhesive composition gave plywood having properties higher than the minimum required.

Example III

To a portion of the N-alkoxymethyl polyamide solution there was added meta-cresol in amount sufficient to have a mole ratio of formaldehyde to cresol of 3/1. The solution was stirred on a steam bath for 6½ hours, 1% (based on weight of total solids) of maleic acid was added and plywood prepared by pressing laminae obtained by applying the solution to $\frac{1}{16}$" birch veneer followed by drying. The laminae were pressed at 140° C. for 20 minutes at 70 lbs./sq. in. pressure. The resulting plywood had a dry shear strength of 640 lbs./sq. in. with 80% wood failure and after 3 hours in boiling water had a shear strength of 480 lbs./sq. in. with 100% wood failure.

Example IV

To 22.7 parts of the N-alkoxymethyl polyamide solution there was added 5 parts of zein and 10 parts of 75% alcohol as solvent for the zein. The mixture was heated 10 minutes on a steam bath and cooled, after which 0.77% (based on total solids) maleic acid was added. The solution was coated on $\frac{1}{16}$" birch veneer and after evaporation of volatile material, the plies were bonded by heating at 123° C. for 20 minutes under 70 lbs./sq. in. pressure. The dry shear strength of the resulting plywood was 438 lbs./sq. in. with approximately 100% wood failure. After immersing a test strip of the plywood for 3 hours in boiling water, the sample had a shear strength of 448 lbs./sq. in. with 82% wood failure.

As previously indicated, any synthetic linear polyamide that has hydrogen-bearing carbonamide groups can be used in the process of this invention. Specific examples include polyhexamethylene adipamide, polydecamethylene adipamide, interpolymers such as polyhexamethylene adipamide-polyhexamethylene sebacamide, polycaproamide interpolymers, etc.

In the reaction of the synthetic linear polyamides with alcohol and formaldehyde, formaldehyde-liberating substances such as para-formaldehyde can be used instead of formaldehyde. In the first part of the reaction as previously described, the formaldehyde is not completely used up in the reaction with the polyamides. The resulting solution of the N-alkoxymethyl polyamide cannot be used for many applications, e. g., in the bonding of plywood where substantial amounts of free formaldehyde is undesirable. However, reaction of the solution directly with a formaldehyde-reactive material reduces the formaldehyde content from an average of approximately 10-20% to a satisfactorily low value, usually less than 4-7%, the exact amount depending on the material used and the length of the reaction period. In general, proteins such as zein are less reactive per unit weight with formaldehyde than phenol or urea and consequently larger amounts of the proteinaceous materials are required.

The substances which react with formaldehyde to form resins can be added directly to the solution containing N-alkoxymethyl polyamide, alcohol, formaldehyde and the oxygen-containing acid catalyst of the type previously mentioned before the acid catalyst is neutralized. However, it is usually preferred to carry out the reaction in a neutral to basic medium to prevent degradation of the substituted polyamide.

Curing catalysts, such as maleic acid, phosphoric acid, p-toluene sulfonic acid, zinc chloride, etc., are desirably added to the mixed resin composition. Other catalysts of this kind that can be employed include sodium carbonate, potassium hydroxide, etc.

The process described herein, by reason of the low formaldehyde content of the N-alkoxymethyl polyamide solution after reaction with the resin-forming material, is particularly valuable as a plywood adhesive as shown by the foregoing examples. The value of the resin-modified N-alkoxymethyl polyamide obtained is also enhanced for some purposes due to increased thermosetting properties and greater heat insensitivity of the product. Furthermore, the solvent can be evaporated to give a plastic composition useful in the preparation of films, moldings, etc. Heating of such fabricated compositions insolubilizes and usually results in a product which is resistant to the further effects of heat.

As many apparently widely different embodiments of this invention may be made without departing from the spirit and scope thereof, it is to be understood that I do not limit myself to the specific embodiments thereof except as defined in the appended claims.

I claim:

1. A process which comprises the steps of forming a reaction mixture containing N-alkoxymethyl polyamide by reacting in the presence of a catalyst reactants consisting of a synthetic linear polyamide which has an intrinsic viscosity of at least 0.4, and which has hydrogen bearing intralinear carbonamide groups and in which the average number of carbon atoms separating the amide groups is at least 2, an aliphatic alcohol in which the alcoholic hydroxyl is the sole reactive group, and formaldehyde which is present in substantial excess of that required to form the N-alkoxymethyl polyamide obtained, and which is present in an amount of at least 0.5 part per part of said polyamide, and then reacting the resulting reaction mixture with a formaldehyde-reactive resin-forming material selected from the group consisting of urea, thiourea, melamine, a phenol having at least three nuclear hydrogen atoms, casein, zein, soyabean protein, and a sulfonamide, said catalyst consisting of oxygen-containing acid catalyst having an ionization constant at least as great as $9.6 \times 10^{-6}$ and an equivalent conductance, measured at 25° C. in an 0.01 N concentration, no greater than 270 ohms$^{-1}$ cm.$^2$.

2. The process set forth in claim 1 in which said formaldehyde-reactive material is urea.

3. The process set forth in claim 1 in which said formaldehyde-reactive material is a phenol having at least three nuclear hydrogen atoms.

4. The process set forth in claim 1 in which said formaldehyde-reactive material is zein.

5. A polymeric composition comprising the product obtained by the process set forth in claim 1.

HENRY S. ROTHROCK.

REFERENCES CITED

The following references are of record in the file of this patent:

UNITED STATES PATENTS

| Number | Name | Date |
|---|---|---|
| 2,244,184 | Austin et al. | June 3, 1941 |
| 2,173,005 | Strain | Sept. 12, 1939 |
| 2,260,890 | Edgar et al. | Oct. 28, 1941 |
| 2,317,181 | D'Alelio | Apr. 20, 1943 |
| 2,141,169 | Catlin | Dec. 27, 1938 |